(12) United States Patent  (10) Patent No.: US 8,190,169 B2
Shim  (45) Date of Patent: May 29, 2012

(54) METHOD OF CANCELING LOCATION INFORMATION REQUEST

(75) Inventor: Dong-Hee Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 1378 days.

(21) Appl. No.: 11/293,259

(22) Filed: Dec. 5, 2005

(65) Prior Publication Data

US 2006/0120320 A1  Jun. 8, 2006

(30) Foreign Application Priority Data

Dec. 6, 2004 (KR) ........................ 10-2004-0102005

(51) Int. Cl.
  *H04W 24/00* (2009.01)
  *H04W 4/00* (2009.01)
  *H04M 1/66* (2006.01)

(52) U.S. Cl. ..................... 455/456.1; 455/411; 455/433; 455/456.5; 455/456.6

(58) Field of Classification Search .................. 370/328, 370/310, 338, 401, 349, 352; 455/456.1, 455/404.2, 407–408, 411, 414.1, 414.2, 432.1, 455/432.3, 433, 456.3, 456.2, 458
See application file for complete search history.

(56) References Cited

U.S. PATENT DOCUMENTS

| | | | |
|---|---|---|---|
| 6,195,557 B1 * | 2/2001 | Havinis et al. | 455/456.2 |
| 6,463,289 B1 * | 10/2002 | Havinis et al. | 455/456.4 |
| 6,640,184 B1 * | 10/2003 | Rabe | 701/207 |
| 6,687,504 B1 * | 2/2004 | Raith | 455/456.1 |
| 6,978,135 B2 * | 12/2005 | Sasada | 455/435.1 |
| 7,023,995 B2 * | 4/2006 | Olsson | 380/258 |
| 7,242,946 B2 * | 7/2007 | Kokkonen et al. | 455/456.1 |
| 7,369,863 B2 * | 5/2008 | Holzhauer et al. | 455/456.5 |
| 7,660,590 B2 * | 2/2010 | Timiri et al. | 455/456.3 |
| 7,738,855 B2 * | 6/2010 | Jang et al. | 455/404.1 |
| 2003/0153310 A1 * | 8/2003 | Ishii | 455/435 |
| 2006/0094446 A1 * | 5/2006 | Duan | 455/456.3 |
| 2006/0099961 A1 * | 5/2006 | Duan | 455/456.2 |
| 2007/0127444 A1 * | 6/2007 | Gras et al. | 370/356 |

(Continued)

FOREIGN PATENT DOCUMENTS

CA 2524688 A1 4/2005

(Continued)

OTHER PUBLICATIONS

"3rd Generation Partnership Project; Technical Specification Group Services and System Aspects; Fuctional Stage 2 . . . "3GPP Standard; 3GPP TS 23.271, 3rd Generation Partnership Project (3GPP), France, No. V6.9.0, Sep. 1, 2004, pp. 1-20, XP050363492.

(Continued)

*Primary Examiner* — Pablo Tran
(74) *Attorney, Agent, or Firm* — Birch, Stewart, Kolasch & Birch, LLP

(57) ABSTRACT

A method of canceling a location information request is disclosed, in which if a location server having received a location information request about a specific terminal from an external client is unable to forward location information of the terminal to the external client, the location server can cancel the location information request without a cancellation request from the external client. The location information request cancellation message may be selected among a Triggered Location Report message or a Triggered Location Reporting Stop Answer message or among a Standard Location Immediate Report message or a Standard Location Immediate Stop Answer message according to a location information request message.

3 Claims, 9 Drawing Sheets

U.S. PATENT DOCUMENTS

2007/0173253 A1* 7/2007 Duan et al. .................... 455/433
2007/0238455 A1* 10/2007 Zhu et al. .................... 455/422.1

FOREIGN PATENT DOCUMENTS

| | | | |
|---|---|---|---|
| CN | 1449218 | A | 10/2003 |
| CN | 1606367 | A | 4/2005 |
| EP | 1337123 | A2 | 8/2003 |
| EP | 1672935 | A1 | 6/2006 |
| JP | 2006-522509 | A | 9/2006 |
| JP | 2007-511967 | A | 5/2007 |
| KR | 2003-0024460 | A | 3/2003 |
| KR | 2003-0052841 | A | 6/2003 |
| KR | 2003-0066786 | A | 8/2003 |
| KR | 10-2004-0031983 | A | 4/2004 |
| RU | 2141724 | C1 | 11/1999 |
| WO | WO-98/52379 | A | 11/1998 |
| WO | WO 99/63780 | | 12/1999 |
| WO | WO 03/049478 | A1 | 6/2003 |
| WO | WO 2004/091235 | A1 | 10/2004 |

OTHER PUBLICATIONS

"Mobile Location Protocol Specification Specification" 3GPP2-Drafts, USA, Jun. 6, 2002, pp. 1-92, XP040269668.

* cited by examiner

FIG. 9

```
<slisa ver="3.0.0">
        <result resid="116">PRIVACY PROFILE CHANGED</result>
</slisa>
```

```
<tlrsa ver="3.0.0">
        <result resid="114">CANCELLATION OF TRIGGERED LOCATION REQUEST</result>
</tlrsa>
```

METHOD OF CANCELING LOCATION INFORMATION REQUEST

The present application claims priority benefit of Korean Patent Application No. 10-2004-102005 filed on Dec. 6, 2004 in Korea, the entire contents of which are incorporated by reference.

BACKGROUND OF THE INVENTION

1. Field of the Invention

The present invention relates to a method of canceling a location information request, and more particularly, to a method of canceling a location information request according to privacy information of a terminal whose location is to be tracked.

2. Description of the Related Art

In general, a mobile communication system provides a location service for delivering the location of a terminal (e.g., mobile station) to a specific entity periodically or according to a request by having a functional portion for calculating the location of a terminal in a mobile communication network.

Methods of calculating the location of the terminal include a cell-ID method of delivering the ID of a cell of the terminal, a method of calculating the location of the terminal by a triangular survey procedure after measuring the time it takes a signal wave to reach each neighbor base station from the terminal, a method utilizing a GPS (global positioning system) and so on.

In a related art location service, when a specific Location Service Client (hereinafter, a LCS client) periodically or immediately requests for a location information of a terminal, a location server calculates a location value by tracking the location of the terminal and then forwards it to the LCS client. At this point, the LCS client having requested for the location information may cancel the location information request.

However, in the event that it is impossible to track the location of the terminal whose location tracking is requested by the LCS client, the location server cannot cancel the location tracking request of the LCS client and also cannot provide location information of the terminal to the LCS client. Therefore, as the LCS client cannot know that the location server is unable to perform location tracking, it can continue to request for location information of the terminal if it is not provided with location information from the location server.

As seen from above, in the related art location service, although the LCS client having requested for location information of a specific terminal may cancel the request, nothing has been defined with respect to a method in which the location server having received a location tracking request from the LCS client that later cancels the location tracking request.

Consequently, in the case that the location server is unable to track the location of a terminal requested by the LCS client, there is a problem that a communication network is used inefficiently and the load of the location server increases since the LCS client continues to request the location server for location information of the terminal.

BRIEF DESCRIPTION OF THE INVENTION

Therefore, an object of the present invention is to provide a method of canceling a location information request in which a location server can cancel a location information request forwarded from a LCS client by itself.

Another object of the present invention is to provide a method of canceling a location information request in which a location server can cancel a location information request by itself according to an update of privacy information of a terminal whose location information is requested by a LCS client.

To accomplish the above objects, there is provided a method of canceling a location information request according to the present invention, wherein in a case where a location server receives a location information request about a specific terminal but the location server cannot provide location information of the terminal, the location server initiates to cancel the location information request.

A method of canceling a location information request according to the present invention comprises the steps of: an external client requesting a location server for information of a specific terminal; the location server checking privacy information of the terminal; and the location server canceling the location information request according to the privacy information of the terminal.

A method of canceling a location information request according to the present invention comprises the steps of: a location server receiving a location information request message about a specific terminal; if the terminal belongs to a service area of the location server, the location server calculating the location of the terminal and checking privacy information of the terminal; and if the privacy of the terminal is 'non-disclosed' state, the location server forwarding a location information request cancellation message.

A method of canceling a location information request according to the present invention comprises the steps of: a first location server receiving a location information request message about a specific terminal; if the terminal belongs to a service area of a second location server, the first location server forwarding a location information request message about the terminal to the second location server; and if the privacy of the terminal is 'non-disclosed' state, the first location server forwarding a location information request cancellation message.

A method of canceling a location information request according to the present invention, in the case of forwarding location information of a terminal belonging to a service area of a location server, comprising the steps of: the location server receiving a Standard Location Immediate Request message requesting for location information of the terminal; the location server calculating the location of the terminal and checking privacy information of the terminal; and if the privacy of the terminal is 'non-disclosed' state, the location server optionally forwarding a Standard Location Immediate Report message or a Standard Location Immediate Stop Answer message.

A method of canceling a location information request according to the present invention, in the case of forwarding location information of a terminal belonging to a service area of a location server, comprising the steps of: the location server receiving a Triggered Location Reporting Request message requesting for location information of the terminal; if the condition set up for the Triggered Location Reporting Request message is satisfied, the location server calculating the location of the terminal and checking privacy information of the terminal; if the privacy of the terminal is 'non-disclosed' state, the location server optionally forwarding a Triggered Location Report message or a Triggered Location Reporting Stop Answer message.

A method of canceling a location information request according to the present invention, in the case that a first server forwards location information of a terminal belonging to a service area of a second location server, comprising the steps of: the first location server receiving a Standard Location Immediate Request message requesting for location information of the terminal; the first location server forwarding a location information request message about the terminal to the second location server and receiving a location information report message containing the location information of the terminal; the first location server checking privacy information of the terminal; and if the privacy of the terminal is 'non-disclosed' state, optionally forwarding a Standard Location Immediate Report message or a Standard Location Immediate Stop Answer message.

A method of canceling a location information request according to the present invention, in the case that a first server forwards location information of a terminal belonging to a service area of a second location server, comprising the steps of: the first location server receiving a Triggered Location Reporting Request message requesting for location information of the terminal; the first location server forwarding a location information request message about the terminal to the second location server and receiving a location information report message containing the location information of the terminal; the first location server checking privacy information of the terminal; and if the privacy of the terminal is 'non-disclosed' state, optionally forwarding a Triggered Location Report message or a Triggered Location Reporting Stop Answer message.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 9 illustrates an exemplary location information request cancellation message implemented by XML according to the present invention.

DETAILED DESCRIPTION OF THE INVENTION

Hereinafter, preferred embodiments of a method of canceling a location information request according to the present invention will be described with reference to the accompanying drawings.

The present invention relates to a method of canceling a location information request in which, in the case that a location server having received a location information request about a specific terminal (e.g., mobile station, handset, wireless communication device, etc.) from a Location Service Client (LCS) client is unable to track the location of the terminal, the location server forwards a location information request cancellation message to the LCS client. At this point, the location information request cancellation message forwarded to the LCS client by the location server is a Triggered Location Report message or Triggered Location Reporting Stop Answer message and a Standard Location Immediate Report message or Standard Location Immediate Stop Answer message that are defined in the MLP (Mobile Location Protocol).

If the location server has received a Standard Location Report Request message from the LCS client, it forwards a Standard Location Report message. If the location server has received a Triggered Location Report Request message from the LCS client, it forwards a Triggered Location Report message or a Triggered Location Reporting message.

In a case where the Triggered Location Report message, Triggered Location Reporting Stop Answer message and Standard Location Report message are used as the location information request cancellation message, the parameter indicating the reason why the location information request is canceled may be added into the message.

Figure 1:
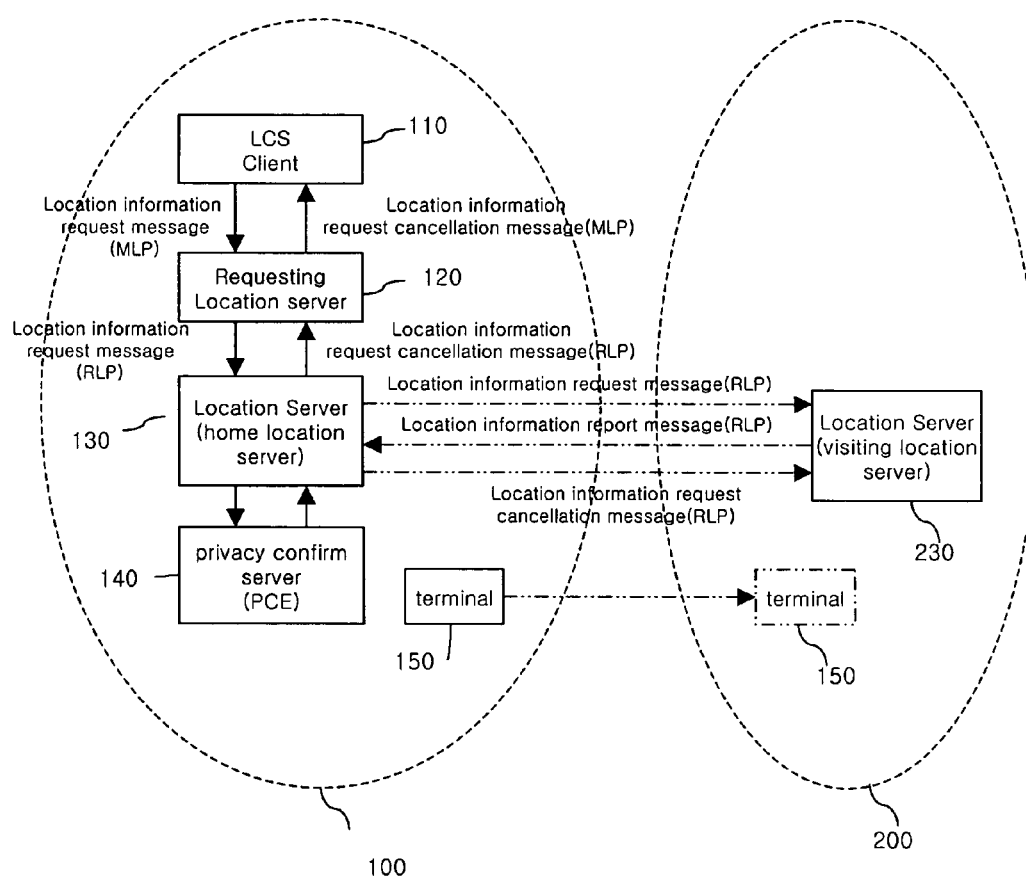
FIG. 1 illustrates the configuration of an exemplary location service provision system according to the present invention.

FIG. 1 illustrates an exemplary configuration of a location service provision system according to the present invention. The location service provision system may be divided into a first service area 100 in which a home location server 130 tracks the location of a terminal 150 and a second service area 200 in which a visiting location server 230 tracks the location of the terminal 150.

The first service area 100 may include a LCS client 110 for requesting location information of a terminal 150 whose location is to be tracked, a home location server 130 for providing location information of the terminal 150 to the LCS client 110, a request location server 120 serving as a proxy between the LCS client 100 and the home location server 130, and a privacy check entity (PCE) 140 storing privacy information about the terminal 150. The second service area 200 includes a visiting location server 230 for tracking the location of the terminal 150 and forwarding acquired location information to the home location server 130 if the terminal 150 belongs to the second service area.

If the terminal 150 belongs to the first service area, when the home location server 130 receives a location information request message from the LCS client 110, the home location server 130 forwards a location information report message or a location information request cancellation message to the LCS client 110 according to privacy information of the terminal 150 stored in the privacy check server 140. Here, the privacy information is information informing whether the location information of the terminal 150 is 'disclosed' or 'non-disclosed' state, which is stored in the privacy check server 140 by the terminal 150 or other interworking device.

On the other hand, if the terminal 150 belongs to the second service area, the home location server 130 cannot detect the location of the terminal 150 by itself, and thus forwards a location information request message to the visiting location server 230. The visiting location server 230 forwards a location information report message containing the location information of the terminal 150 to the home location server 130, and the home location server 130 checks the privacy information of the terminal 150 from the privacy check server 140. When the home location server 130 confirms through the privacy information that the location information of the terminal 150 is 'non-disclosed' state, it forwards a location information request cancellation message to the LCS client 110 and the visiting location server 230.

At this point, the location information request message, location information report message and location information request cancellation message forwarded between the LCS client and the requesting server is a Mobile Location Protocol (hereinafter referred to as MLP), while the location information request message, the location information report message, and the location information request cancellation message forwarded between the requesting server and the home location server and between the home location server and the visiting location server is a Roaming Location Protocol (hereinafter referred to as RLP). The MLP is an application protocol between an external LCS client and a location server, and the RLP is an application protocol between location servers.

Figure 2:
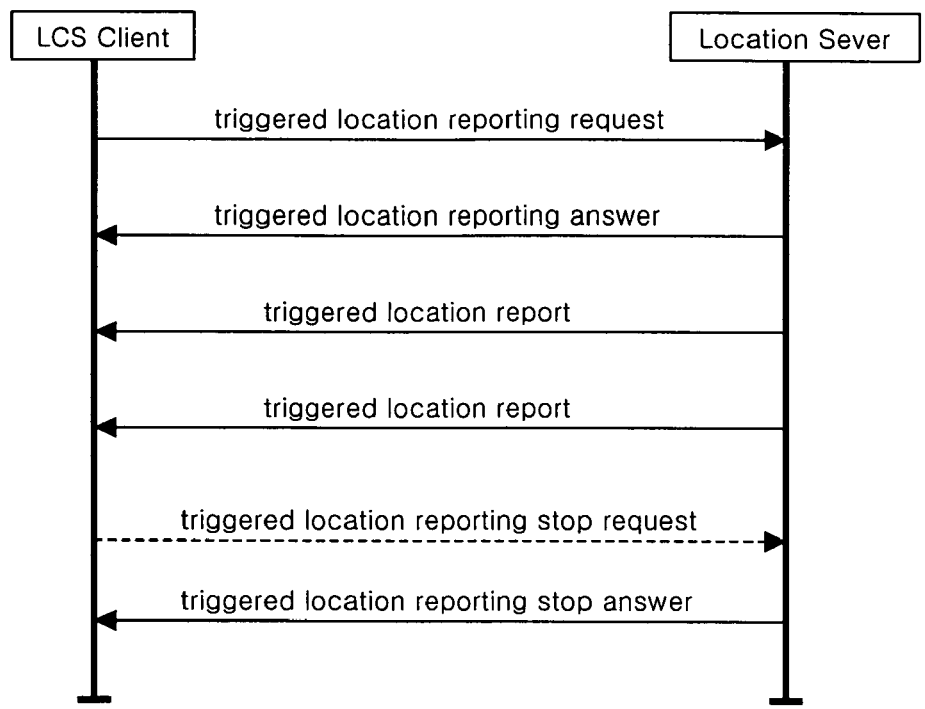
FIG. 2 illustrates an exemplary method of canceling a location information request between a LCS client and an exemplary location server according to the present invention.

FIG. 2 illustrates an exemplary method of canceling a location information request between a LCS client and a location server according to the present invention, in which a MLP is used as a message forwarded between the LCS client and the location server. Referring to FIG. 2, the LCS client forwards a Triggered Location Reporting Request message to the location server in order to request the location information of a specific terminal, and the location server forwards a Triggered Location Reporting Answer message as a response message. Thereafter, the location server tracks the location of the terminal at a time interval set up for the Triggered Location Reporting Request message or when a specific preset event occurs, and delivers a Triggered Location Report message containing resulting acquired location information to the LCS client.

If the location server unilaterally decides to terminate the location reporting, the stop reporting information shall be carried (included) in the Triggered Location Report message. The cancellation of the Triggered Location Reporting Request message could be initiated by the location server itself for certain reasons, such as privacy profile updating. In this case, the Triggered Location Reporting Stop Answer message may be sent without a preceding Triggered Location Reporting Stop Request message.

Parts of the Triggered Location Reporting Stop Answer (TLRSA) message may be implemented by XML as follows:

```
<!ENTITY    % extension.param    "">
<!ELEMENT tlrsa           ((req_id | (result, add_info?))
                          %extension.param;)>
<!ATTLIST tlrsa
    ver CDATA             #FIXED "3.0.0">
```

The Triggered Location Reporting Stop Answer message contains the result information of location tracking performed by the location server. The result information is provided through a "Result Code" indicating at least one of a result, a location value and an individual positioning for a request from the LCS client.

Figure 3:
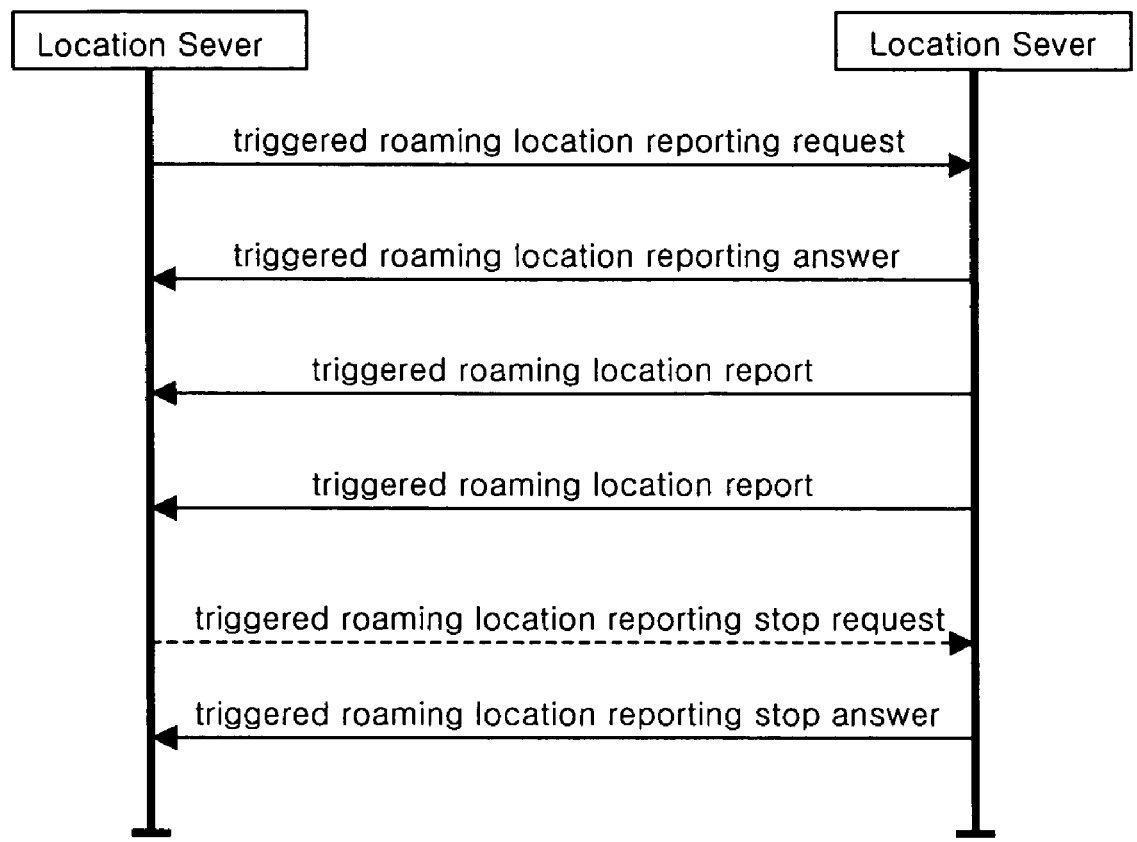
FIG. 3 illustrates an exemplary method of canceling a location information request between location servers according to the present invention.

FIG. 3 illustrates an exemplary method of canceling a location information request between location servers according to the present invention. Messages as illustrated therein are forwarded by using a RLP. Referring to FIG. 3, a location server A forwards a Triggered Roaming Location Reporting Request message to a location server B in order to request the location information of a terminal belonging to the area of the location server B, and the location server B forwards a Triggered Roaming Location Reporting Answer message as a response message. Thereafter, the location server B tracks the location of the terminal at a time interval set up for the Triggered Roaming Location Reporting Request message and when a specific set event occurs, and delivers a Triggered Roaming Location Report message containing resulting acquired location information to the location server A.

Thereafter, when the location server A forwards a Triggered Roaming Location Reporting Stop Request message to the location server B, the location server B stops a location tracking procedure and forwards a Triggered Roaming Location Reporting Stop Answer message to the location server A. At this time, the location server B stops the location tracking procedure by itself and may forward a Triggered Roaming Location Reporting Stop Answer message to the location server A even though it has not received a Triggered Roaming Location Reporting Stop Request message. Namely, the cancellation of the Triggered Roaming Location Reporting Request message may be initiated by any of the location servers for certain reasons, such as an updating of privacy information.

Parts of the Triggered Roaming Location Report Stop Answer (TLRSA) message may be implemented by XML as follows:

```
<!ENTITY    % extension.param    "">
<!ELEMENT trlrsa          ((req_id | (result, add_info?))
                          %extension.param;)>
<!ATTLIST trlrsa
    ver CDATA             #FIXED "1.0.0">
```

The result information contained in the Triggered Location Reporting Stop Answer message may be configured with reference to a "Result Code" defined in the MLP.

Figure 4:
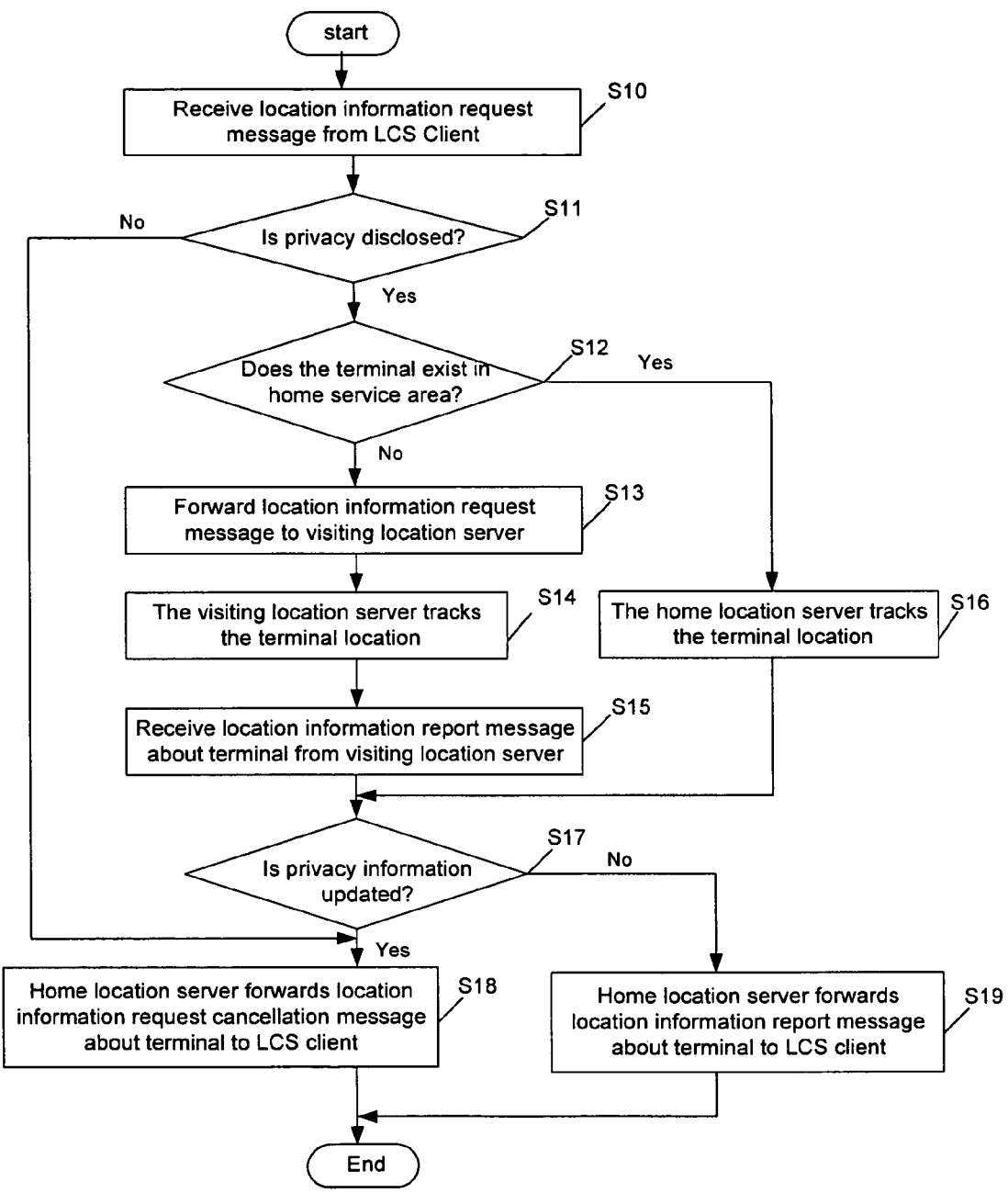
FIG. 4 illustrates an exemplary location service method according to the present invention.

FIG. 4 illustrates an exemplary location service method according to the present invention. Referring to the drawing, a service procedure performed in a home location server will be described.

When the home location server receives from a LCS client a location information request message about a terminal whose location is to be tracked (S10), the home location server checks the privacy information of the terminal (S11). The privacy information indicates if the location information of the terminal is 'disclosed', and it may be set up in a privacy check entity by the terminal or other external interworking device.

If the privacy information of the terminal is set to the 'disclosed' state, the LCS client investigates the service area where the terminal belongs through a HLR (home location register) (S12). If the terminal exists in a home service area, the home location server calculates a location value of the terminal (S16), and then it checks the privacy information of the terminal once again (S17). If the privacy information is set to the 'non-disclosed' state by update, the home location server forwards a location information request cancellation message about terminal to LCS client (S18). However, if the privacy information of the terminal is still set to the 'disclosed' state, the home location server forwards a location information report message about the terminal to the LCS client (S19). The location information report message contains a location value of the terminal calculated by the home location server.

On the other hand, if the terminal does not exist in a home service area, the home location server forwards a location information request message to the location server (i.e., visiting location server) of the area where the terminal belongs (S13). Then, the visiting location server calculates a location value of the terminal (S14) and it sends the location information report message about the terminal to the home location sever (S15). The home location server upon receiving the location information report message checks whether the privacy information is updated (S17). If the privacy information is set to the 'non-disclosed' state by update, the home location server forwards location information request cancellation message about terminal to LCS client (S18), and if the privacy information of the terminal is not updated, the home location server forwards a location information report message about the terminal to the LCS client (S19).

However, in steps S12 and S16, if the privacy information of the terminal checked by the home location server is set to the 'non-disclosed' state, the home location server forwards a location information request cancellation message about the terminal to the LCS client S17. The location information request cancellation message contains information indicating that the privacy of the terminal is 'non-disclosed' state.

The aforementioned method of canceling a location information request can be carried out by using a Standard Location Immediate service and a Triggered Location Reporting service among a variety of location services defined in the MLP. The Standard Location Immediate service is a service used when a response to a location information request from the LCS client is immediately required, and the Triggered Location Reporting service is a service for providing location information of a mobile service subscriber at a predetermined time interval or when a specific event occurs.

Figure 5:
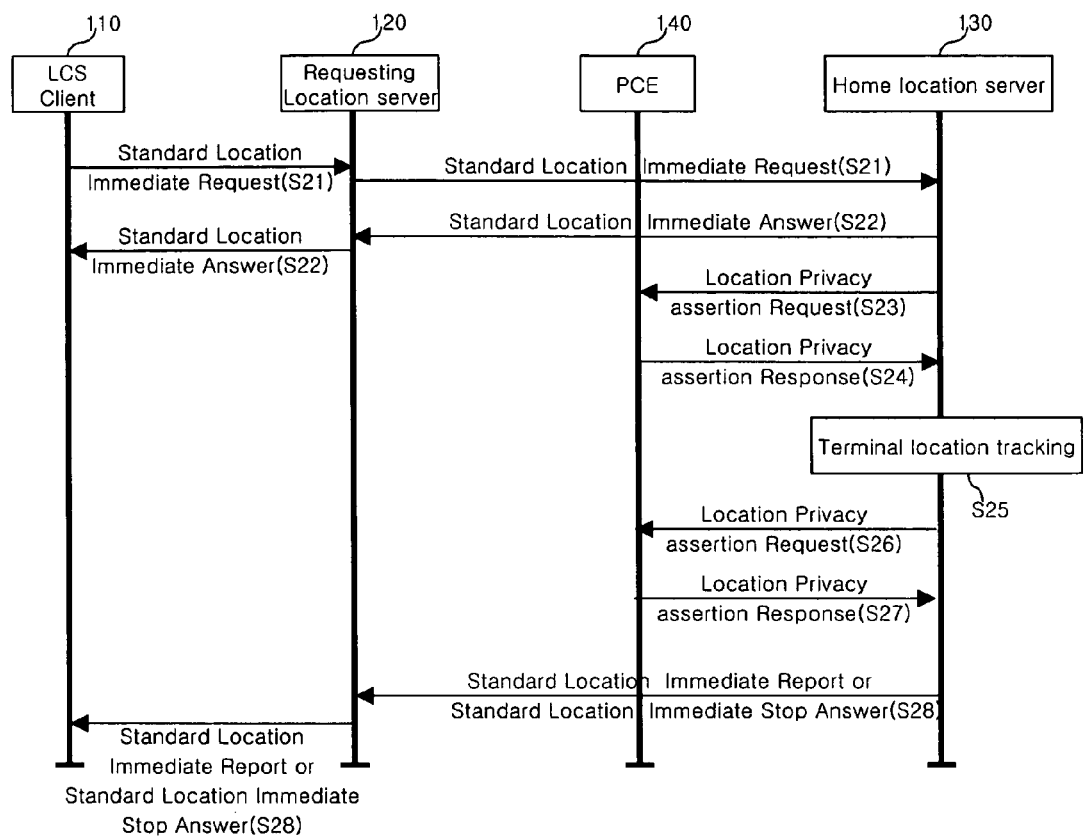
FIG. 5 illustrates an exemplary method of canceling a location information request according to a first embodiment of the present invention.

FIG. 5 illustrates an exemplary method of canceling a location information request according to a first embodiment of the present invention. A method of canceling a location information request will be described with respect to the case that a terminal whose location is to be tracked belongs to the area of a home location server. In the first embodiment, a Standard Location Immediate Service is utilized.

A LCS client 110 forwards a location information request message to a home location server 130 through a requesting location server 120 in order to request for location information of a specific terminal (S21). In the Standard Location Immediate service, the location information request message is a Standard Location Immediate Request message.

The location sever 130 having received the Standard Location Immediate Request message forwards a Standard Location Immediate Answer message as a response message to the above message to the LCS client 110 through the requesting location server 120 (S22).

The home location server 130 forwards a Location Privacy Assertion Request message to a privacy check entity 140 in order to request privacy information of the terminal whose location is to be tracked (S23). The privacy check entity 140 stores the privacy information indicating whether the location information of the terminal is 'disclosed' or 'non-disclosed' state by the terminal or other interworking device.

The privacy check entity 140 forwards a Location Privacy Assertion Response message containing the privacy information of the terminal to the home location server 130 (S24). At this time, the home location server 130 checks the privacy information contained in the Location Privacy Assertion Response message, and if the privacy of the terminal is 'disclosed', it calculates a location value of the terminal (S25). And, the home location server 130 re-checks the privacy information of the terminal set up in the privacy check entity 140 in the same manner as in steps S23 and S24 (S26 and S27). Here, the Location Privacy Assertion Request message and the Location privacy Assertion Response message are forwarded by using a privacy check protocol (PCP).

At this time, if the privacy of the terminal 150 is changed from 'disclosed' to 'non-disclosed' state and thus the location server 130 is unable to forward the location information, the location server 130 forwards a location information request cancellation message to the LCS client 110 (S28). Here, the location server can optionally forward a Standard Location Immediate Report message or a Standard Location Immediate Stop Answer message as the location information request cancellation message.

The Standard Location Immediate Report message and the Standard Location Immediate Stop Answer message contain a parameter specifying the reason why the home location server cancels the location information request. The home location server can cancel the location information request from the LCS client by using a dedicated message indicating that the location information request is canceled, instead of using a message containing a parameter.

In FIG. 5, the procedure after step S25 has been illustrated under the assumption that the privacy of the terminal is disclosed in the Location Privacy Assertion Response message in step S24. However, if the privacy of the terminal is 'non-disclosed' state, step S28 is carried out without undergoing steps S25 to S27.

Figure 6:
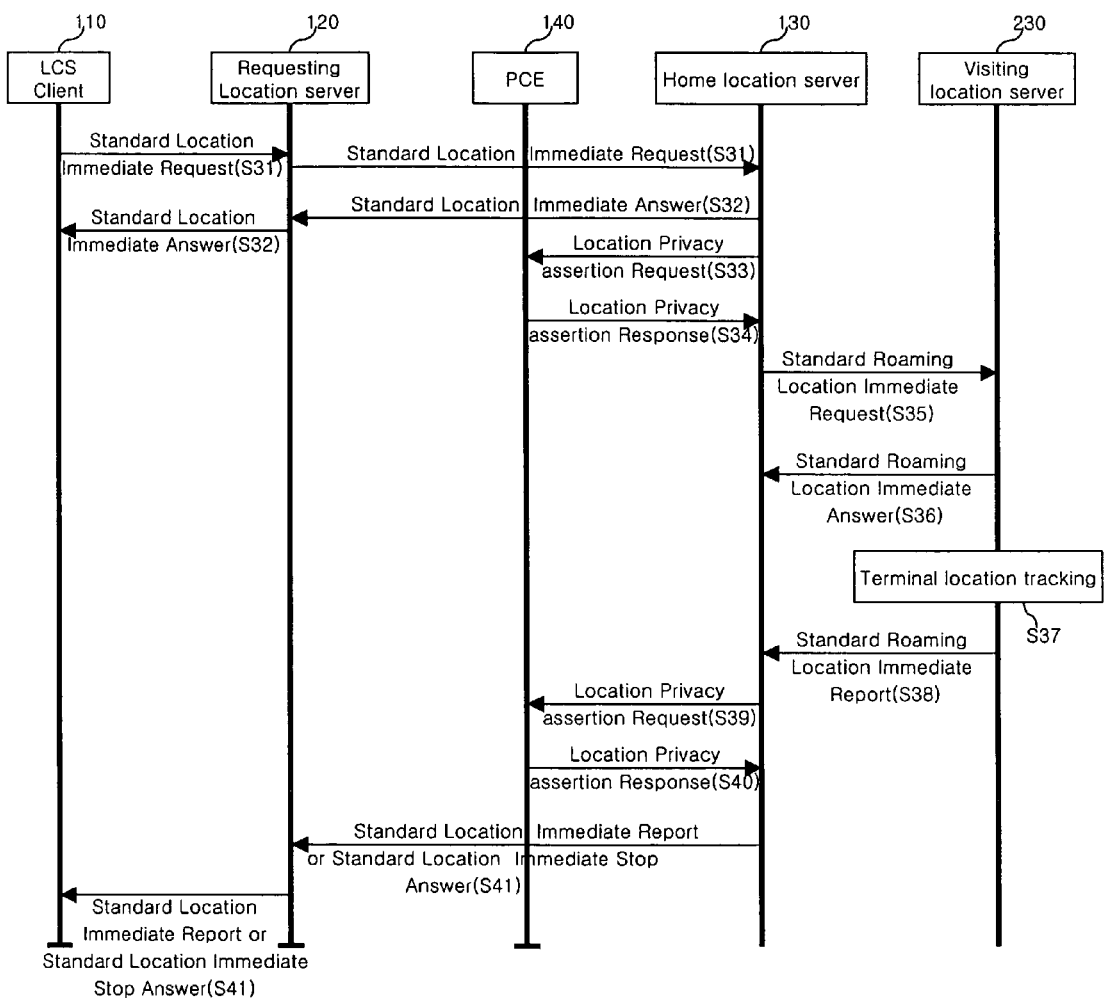
FIG. 6 illustrates an exemplary method of canceling a location information request according to a second embodiment of the present invention.

FIG. 6 illustrates an exemplary method of canceling a location information request according to a second embodiment of the present invention, in which a method of canceling a location information request in a case where a terminal whose location is to be tracked belongs to not the area of the home location server but to the area of another location server (i.e., visiting location server). The second embodiment utilizes a Standard Location Immediate service.

A LCS client 110 forwards a Standard Location Immediate Request message to a home location server 130 through a requesting location server 120 in order to request the location information of a specific terminal (S31). The location sever 130 having received the Standard Location Immediate Request message forwards a Standard Location Immediate Answer message as a response message to the above message to the LCS client 110 (S32).

The home location server 130 forwards a Location Privacy Assertion Request message to a privacy check entity 140 in order to request for privacy information of the terminal whose location is to be tracked (S33), and receives a Location Privacy Assertion Response message containing the privacy information of the terminal (S34). The privacy information is information set up in the privacy check entity 140 by the terminal or other interworking device, which indicates whether the location information of the terminal is 'disclosed' or 'non-disclosed' state. Here, the location server can optionally forward a Standard Location Immediate Report message or a Standard Location Immediate Stop Answer message as the location information request cancellation message.

When the home location server 130 having received the Location Privacy Assertion Response message confirms through the privacy information contained in the message that the location information of the terminal is disclosed, the home location server 130 checks the location of the terminal. Since the terminal does not belong to the home service area, the home location server 130 forwards a Standard Roaming Location Immediate Request message for requesting the location information of the terminal to a location server 230 of the service area where the terminal belongs (S35). The visiting location server 230 delivers a response message (i.e., Standard Roaming Location Immediate Answer) to the Standard Roaming Location Immediate Request message to the home location server 130, and calculates the location value of the terminal (S37). And, the visiting location server 230 allows the location value of the terminal to be contained in the Standard Roaming Location Immediate Report message to forward it to the home location server 130 (S38).

Prior to forwarding the location information to the LCS client 110, the home location server 130 having acquired the location information of the terminal re-checks the privacy information of the terminal set up in the privacy check entity 140 (S38 to S40).

At this time, in the case that the privacy information of the terminal is changed and thus the location server 130 is unable to forward the location information, the location server 130 forwards a location information request cancellation message to the LCS client 110 through the requesting location server 120 (S41). Here, the location server can optionally forward a Standard Location Immediate Report message or a Standard Location Immediate Stop Answer message as the location information request cancellation message.

The Standard Location Immediate Report message and the Standard Location Immediate Stop Answer message contain a parameter specifying the reason why the home location server cancels the location information request. The home location server can cancel the location information request from the LCS client by using a dedicated message indicating that the location information request is canceled, instead of using a message containing a parameter.

Figure 7:
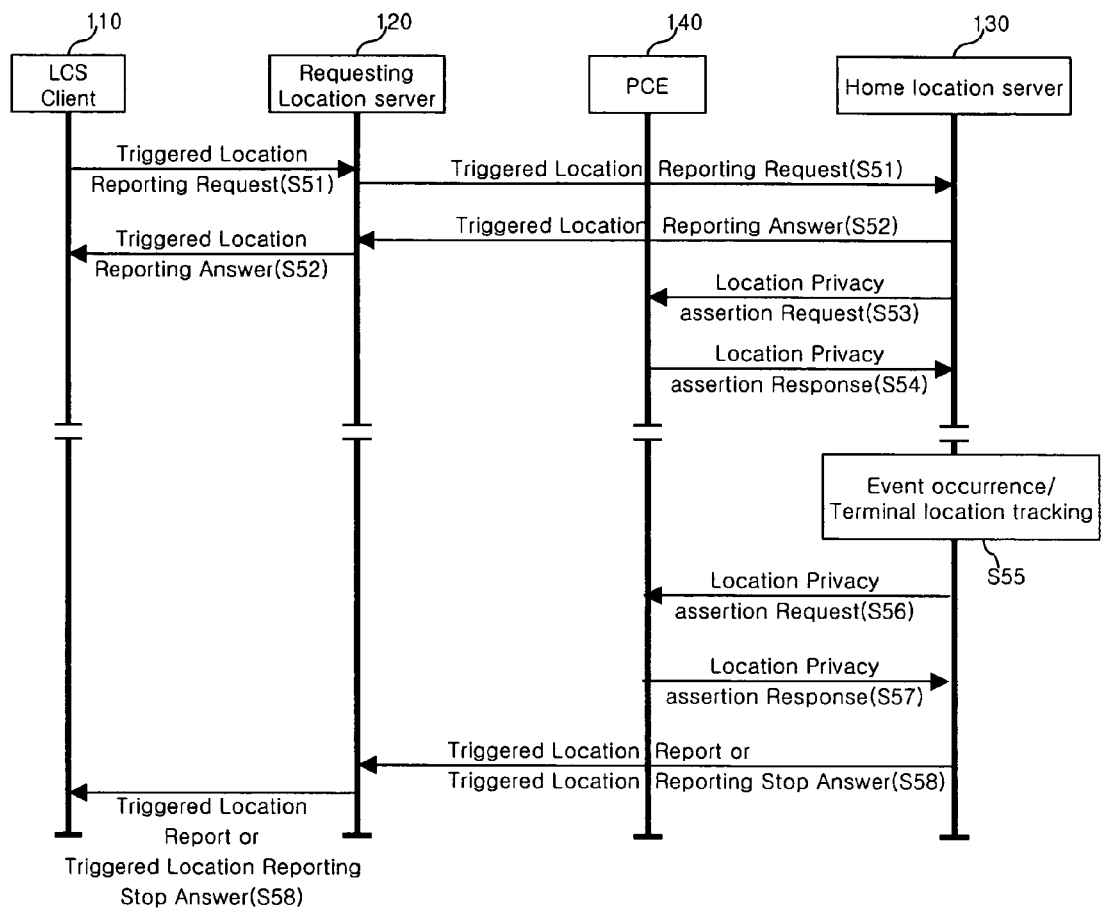
FIG. 7 illustrates an exemplary method of canceling a location information request according to a third embodiment of the present invention.

FIG. 7 illustrates an exemplary method of canceling a location information request according to a third embodiment of the present invention, in which a method of canceling a location information request in a case where a terminal whose location is to be tracked belongs to the area of the home location server. The third embodiment utilizes a Triggered Location Reporting service.

A LCS client 110 forwards a location information request message to a home location server 130 through a requesting location server 120 in order to request for location information of a specific terminal (S51). At this time, the location information request message is a Triggered Location Reporting Request message, which is a message forwarded to request the home location server 130 to track the location of the terminal at a time interval set up for the message or when a specific event occurs.

The location sever 130 having received the Triggered Location Reporting Request message forwards a Triggered Location Reporting Answer message as a response message to the LCS client 110 (S52), and forwards a Location Privacy Assertion Request message requesting for privacy information of the terminal to a privacy check entity 140 (S53). The privacy check entity 140 stores the privacy information of the terminal set up by the terminal or other interworking device, and the privacy information indicates whether the location information of the terminal is 'disclosed' or 'non-disclosed' state The privacy check entity 140 having received the Location Privacy Assertion Request message allows the privacy information of the terminal to be contained in the Location Privacy Assertion Response message and forwards it to the home location server 130. At this time, the Location Privacy Assertion Request message and the Location Privacy Assertion Response message are forwarded by using a privacy check protocol (PCP).

If the location server 130 confirms that the privacy of the terminal is 'non-disclosed' state, it forwards a location information request cancellation message to the LCS client 110. At this time, the location information request cancellation message may be a Triggered Location Report message or a Triggered Location Reporting Stop Answer message.

On the other hand, if the location server 130 confirms that the privacy of the terminal is 'disclosed', it tracks the location of the terminal at a time interval set up for the Triggered Location Reporting Request message or when an event occurs and calculates a location value (S55). And, the home location server 130 checks through the privacy check entity 140 if the privacy information of the terminal 150 is updated (S56 and S57).

If the privacy of the terminal is updated from 'disclosed' to 'non-disclosed' state, the home location server 130 forwards a Triggered Location Report message or a Triggered Location Reporting Stop Answer message to the LCS client 110 (S58). The Triggered Location Report message and the Triggered Location Reporting Stop Answer message contain a parameter indicating the reason why the location information request is canceled. The location server can cancel the location information request from the LCS client by using a dedicated message indicating that the location information request is canceled, instead of using a message containing a parameter.

Meanwhile, the location server 130 having forwarded the Triggered Location Report message or Triggered Location Reporting Stop Answer message may cancel location tracking settings for the terminal that are stored therein.

Figure 8:
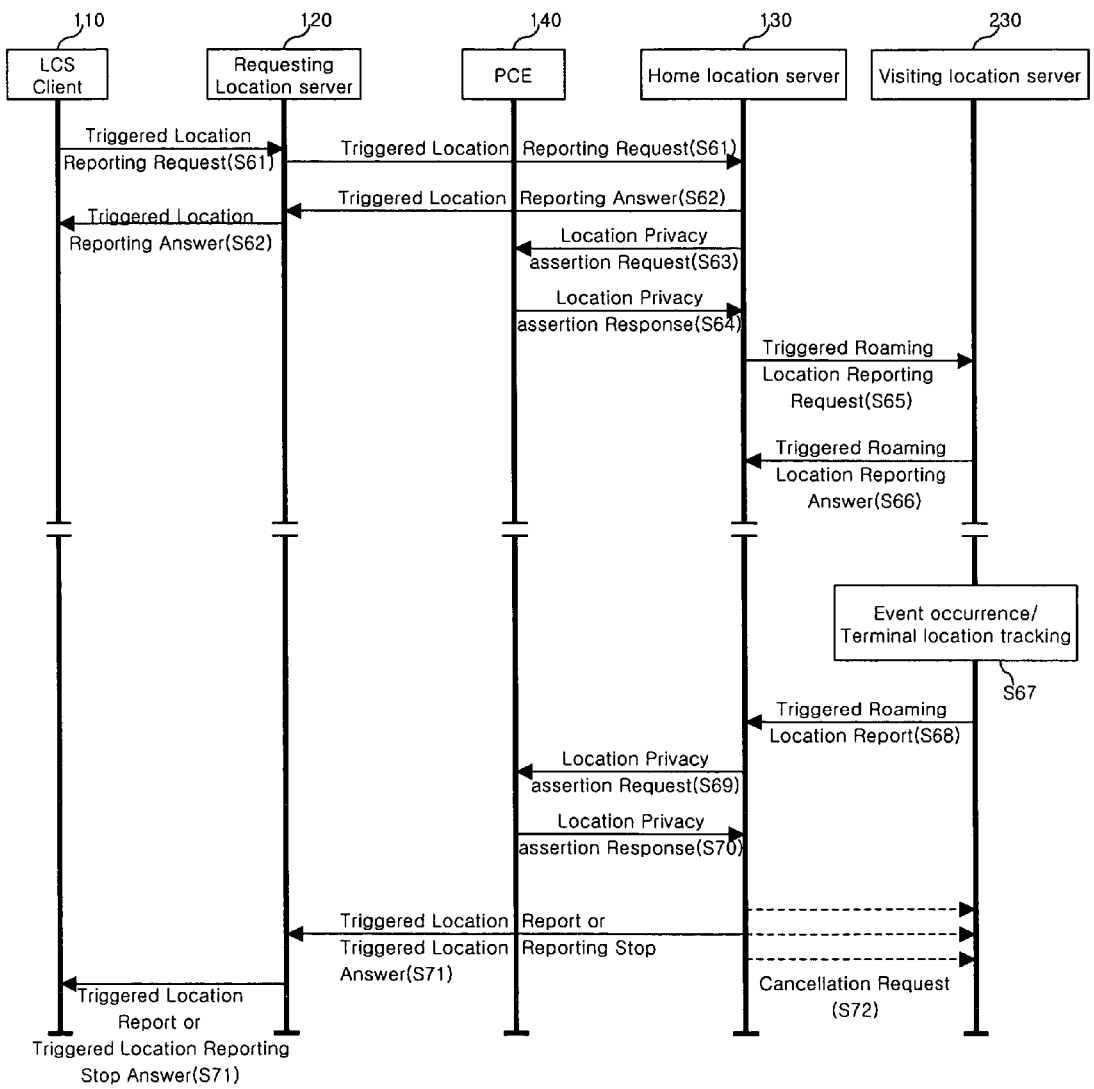
FIG. 8 illustrates an exemplary method of canceling a location information request according to a fourth embodiment of the present invention.

FIG. 8 illustrates an exemplary method of canceling a location information request according to a fourth embodiment of the present invention, in which a method of canceling a location information request in a case where a terminal whose location is to be tracked belongs not to the area of the home location server but to the area of other location server (visiting location server). The fourth embodiment utilizes a Triggered Location Reporting service.

A LCS client 110 forwards a Triggered Location Reporting Request message to a home location server 130 through a requesting location server 120 in order to request for location information of a specific terminal (S61). The location sever 130 having received the Triggered Location Reporting Request message forwards a Triggered Location Reporting Answer message as a response message to the above message to the LCS client 110 (S62), and requests for privacy information of the terminal whose location is to be tracked by forwarding a Location Privacy Assertion Request message to a privacy check entity 140 (S63). The privacy check entity 140 stores the privacy information of the terminal set up by the terminal or other interworking device, and the privacy information indicates whether the location information of the terminal is 'disclosed' or 'non-disclosed' state.

The privacy check entity 140 having received the Location Privacy Assertion Request message allows the privacy information of the terminal to be contained in the Location Privacy Assertion Response message and forwards it to the home location server 130 (S64). At this time, the Location Privacy Assertion Request message and the Location Privacy Assertion Response message are forwarded by using a privacy check protocol (PCP).

Once the home location server 130 confirms that the privacy of the terminal is 'disclosed', it forwards a Triggered Roaming Location Reporting Request message to a location server 230 of the service area to which the terminal is moved (S65), and the visiting location server 230 forwards a Triggered Roaming Location Reporting Answer message as a response message (S66).

The visiting location server 230 tracks the location of the terminal at a time interval set up for the Triggered Roaming Location Reporting Request message or when an event occurs and calculates a location value (S67). And, the visiting location server 130 forwards a Triggered Roaming Location Report message containing the location value of the terminal to the home location server 130 (S68). At this time, the Triggered Roaming Location Reporting Request message, Triggered Roaming Location Reporting Answer message and Triggered Roaming Location Report message sent and received between the home location server 130 and the visiting location server 230 are forwarded according to a RLP.

The home location server 130 detects the location of the terminal through the Triggered Roaming Location Report message, and then checks through the privacy check entity 140 if the privacy information of the terminal is updated (S69 and S70).

If the privacy information of the terminal is updated, and thus the home location server 130 cannot forward the location information of the terminal, it forwards a Triggered Location Report message or a Triggered Location Reporting Stop Answer message to the LCS client 110 (S71). The Triggered Location Report message and the Triggered Location Reporting Stop Answer message contain a parameter indicating the reason why the location information request is canceled. The location server can cancel the location information request from the LCS client by using a dedicated message indicating that the location information request is canceled, instead of using a message containing a parameter. Meanwhile, the location server 130 may cancel a location tracking request for the terminal by forwarding a Cancellation Request message to the visiting location server 230 (S72). That is, the home location server 130 may forward the Cancellation Request message before, simultaneously with or after forwarding the location information request message to the LCS client 110.

As described above, in the Triggered Location Reporting service, the location information request cancellation message forwarded by the location server in order to cancel the location information request of the LCS client is the Triggered Location Report message or Triggered Location Reporting Stop Answer message. At this time, the location server may forward the Triggered Location Reporting Stop Answer message to the LCS client even when it has not received the Triggered Location Reporting Stop Answer message.

FIG. 9 illustrates an exemplary location information request cancellation message implemented by XML according to the present invention. As illustrated therein, the location information request cancellation message may contain a parameter of 'CANCELLATION OF TRIGGERED LOCATION REQUEST' or 'PRIVACY PROFILE CHANGED'. For example, in a case where the privacy information of the terminal whose location is to be tracked is updated and thus the location server cannot provide location information, a corresponding parameter 'PRIVACY PROFILE CHANGED' is contained in the location information request cancellation message along with a corresponding result code (Resid=116). Alternatively, in a case where the location server cancels the location information request by itself, a parameter 'CANCELLATION OF TRIGGERED LOCATION REQUEST' indicating that the requested triggered location report is cancelled is contained in the location information request cancellation message along with a corresponding result code (Resid=114).

The following table defines exemplary parts of the result codes that indicate the result of the request or individual positioning. The error codes for the request specific errors may range from 100 to 199.

| Resid | Slogan | Description |
| --- | --- | --- |
| 110 | INVALID PROTOCOL ELEMENT VALUE | A protocol element in the request has an invalid value. The element is indicated in ADD_INFO. |
| 111 | INVALID PROTOCOL ELEMENT ATTRIBUTE VALUE | A protocol element attribute in the request has a wrong value. The element is indicated in ADD_INFO. |
| 112 | PROTOCOL ELEMENT VALUE NOT SUPPORTED | A specific value of a protocol element is not supported in the Location Server. The element and value are indicated in ADD_INFO. |
| 113 | PROTOCOL ELEMENT ATTRIBUTE VALUE NOT SUPPORTED | A specific value of a protocol element attribute is not supported in the Location Server. The attribute and value are indicated in ADD_INFO. |
| 114 | CANCELLATION OF TRIGGERED LOCATION REQUEST | The requested triggered location report is cancelled. |

In the first and second embodiments, the result codes and parameters are contained in the Standard Location Immediate Report message or Standard Location Immediate Stop Answer message. In the third and fourth embodiments, they are contained in the Triggered Location Report message or Triggered Location Stop Answer message.

As seen from above, in the method of canceling a location information request according to the present invention, if the location server cannot forward location information of a terminal requested from the LCS client, the location server can cancel the location information request by itself.

Moreover, in the method of canceling a location information request according to the present invention, in the case that the location server cannot forward location information of the terminal due to an update of the privacy information of the terminal requested from the LCS client, the privacy for location tracking can be incorporated in real time by the location server forwarding a location information request cancellation message to the LCS client. Further, in the case that the location server is unable to forward location information of the terminal requested from the LCS client, it is possible to prevent the LCS client from generating a location information request again by canceling the request from the LCS client.

The present invention provides the location sever performing a method of canceling a location information request. The location sever comprises a transceiver module, a privacy check module and a processor. The transceiver module may receive a location information request about a specific terminal to be tracked from an external client. The received location information request is canceled if the privacy information of the terminal is being updated. Also, the transceiver module may transmit, to the external client, a location information request cancellation to cancel the received location information request. Here, the location information request cancellation includes a parameter specifying the reason why the location information request is being canceled. The privacy check module checks privacy information of the terminal set up in a privacy check entity upon receiving the location information request. The processor cooperates with the transceiver module and the privacy check module to cancel the received location information request according to the checked privacy information.

Here, if the terminal belongs to a service area of the location server, the processor calculates the location of the terminal, and if the privacy information of the terminal is not permitted to be disclosed, the transceiver module sends the location information request cancellation without the external client's location reporting stop request. If the location information request is a Standard Location Immediate Request message, and if the privacy information of the terminal is not permitted to be disclosed, the processor and the transceiver cooperate to selectively send a Standard Location Immediate Report message or a Standard Location Immediate Stop Answer message without a preceding Standard Location Immediate Stop Request message. If the location information request is a Triggered Location Reporting Request message, and if a condition for the Triggered Location Reporting Request message is satisfied, then the location of the terminal is calculated and the privacy information is checked, and if the privacy information of the terminal is not permitted to be disclosed, the processor and transceiver cooperate to selectively send a Triggered Location Report message or a Triggered Location Reporting Stop Answer message without a preceding Triggered Location Reporting Stop Request message.

On the other hand, if the terminal belongs to a service area of a different location server, the location server forwards the location information request to the different location server, and if the privacy information of the terminal is not permitted to be disclosed, the transceiver module sends the location information request cancellation without the external client's location reporting stop request. If the location information request is a Standard Location Immediate Request message, a location information request message about the terminal is sent to the different location server and a location information report message containing the location information of the terminal is received from the different location server; and if the privacy information of the terminal is not permitted to be disclosed, the processor and the transceiver cooperate to selectively send a Standard Location Immediate Report message or a Standard Location Immediate Stop Answer message without a preceding Standard Location Immediate Stop Request message. If the location information request is a Triggered Location Reporting Request message, a location information request message about the terminal is sent to the different location server and a location information report message containing the location information of the terminal is received from the different location server, and if the privacy information of the terminal is not permitted to be disclosed, the processor and transceiver cooperate to selectively send a Triggered Location Report message or a Triggered Location Reporting Stop Answer message without a preceding Triggered Location Reporting Stop Request message.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of canceling a location information request, comprising:
    receiving, by a location server using a mobile location protocol (MLP), a request from a location service client for location reporting of a target terminal to be positioned for tracking;
    deciding, by the location server, to cancel the location reporting;
    sending, from the location server using the MLP to the location service client, which sent the request, a triggered location reporting stop answer message if the location reporting is decided to be canceled,
    wherein the triggered location reporting stop answer message indicates that the location reporting is canceled,
    wherein the location reporting is canceled due to a change in privacy profile, and
    wherein the triggered location reporting stop answer message is sent without a preceding triggered location reporting stop request message from the location service client.

2. The method of claim 1, wherein the steps are performed by more than one location server in order to support roaming of the target terminal.

3. The method of claim 1, wherein any change in the privacy profile state is indicated by privacy information for the target terminal in a privacy check entity.

* * * * *